US011157003B1

(12) United States Patent
Patel

(10) Patent No.: US 11,157,003 B1
(45) Date of Patent: Oct. 26, 2021

(54) SOFTWARE FRAMEWORK FOR AUTONOMOUS SYSTEM

(71) Applicant: NORTHROP GRUMMAN SYSTEMS CORPORATION, Falls Church, VA (US)

(72) Inventor: Dhaval Patel, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 586 days.

(21) Appl. No.: 15/946,180

(22) Filed: Apr. 5, 2018

(51) Int. Cl.
*G05D 1/00* (2006.01)
*G01C 23/00* (2006.01)
*G08G 5/00* (2006.01)
*B64C 39/02* (2006.01)
*G05D 1/10* (2006.01)

(52) U.S. Cl.
CPC ......... *G05D 1/0088* (2013.01); *B64C 39/024* (2013.01); *G01C 23/00* (2013.01); *G05D 1/0011* (2013.01); *G05D 1/101* (2013.01); *G08G 5/0069* (2013.01); *G08G 5/0086* (2013.01); *B64C 2201/141* (2013.01); *B64C 2201/146* (2013.01)

(58) Field of Classification Search
USPC .......................................................... 701/11
See application file for complete search history.

(56) References Cited

U.S. PATENT DOCUMENTS

| | | |
|---|---|---|
| 5,872,909 A | 2/1999 | Wilner et al. |
| 5,909,577 A | 6/1999 | Devanbu |
| 6,038,031 A | 3/2000 | Murphy |
| 7,996,765 B1 | 8/2011 | Mitnick et al. |
| 10,805,146 B2 | 10/2020 | Bruckart et al. |
| 2002/0010909 A1 | 1/2002 | Charisius et al. |
| 2003/0023956 A1 | 1/2003 | Dulberg et al. |
| 2003/0214508 A1 | 11/2003 | Aleksic et al. |

(Continued)

FOREIGN PATENT DOCUMENTS

WO     2004021136 A2    3/2004

OTHER PUBLICATIONS

Written Opinion and International Search Report, for PCT/US2019/065505 dated Mar. 4, 2020.

(Continued)

*Primary Examiner* — Aniss Chad
*Assistant Examiner* — Mahmoud M Kazimi
(74) *Attorney, Agent, or Firm* — Tarolli, Sundheim, Covell & Tummino LLP

(57) ABSTRACT

A software framework for an autonomous system can include a sortie controller that receives a sortie spawn request from at least one of a station controller, a vehicle controller and a mission controller that are each in communication with at least one of a plurality external systems. The sortie controller can instantiate a given sortie spawn with a reference to a given station model in a set of station models, a given vehicle model in a set of vehicle models and a given mission model in the set of the mission models. The software framework can also include a plurality of functions defined by the station controller, the vehicle controller and the mission controller. Each function can be configured to operate on the sortie spawn. The software frame work can further include a plurality of capabilities. Each capability can includes a plurality of properties.

21 Claims, 3 Drawing Sheets

(56) References Cited

U.S. PATENT DOCUMENTS

| | | |
|---|---|---|
| 2005/0107090 A1* | 5/2005 | Hosein .................. H04W 28/02 |
| | | 455/453 |
| 2006/0159077 A1 | 7/2006 | Vanecek, Jr. |
| 2006/0168331 A1 | 7/2006 | Thompson et al. |
| 2006/0265659 A1 | 11/2006 | Collins et al. |
| 2007/0112574 A1 | 5/2007 | Greene |
| 2007/0132779 A1 | 6/2007 | Gilbert et al. |
| 2007/0147334 A1 | 6/2007 | Guthrie |
| 2008/0009968 A1* | 1/2008 | Bruemmer ............. G06N 3/008 |
| | | 700/245 |
| 2008/0091365 A1 | 4/2008 | Tsang et al. |
| 2008/0141220 A1 | 6/2008 | Kim et al. |
| 2008/0177756 A1 | 7/2008 | Kosche et al. |
| 2009/0037894 A1 | 2/2009 | Unger |
| 2009/0145172 A1 | 6/2009 | Lubert et al. |
| 2009/0204633 A1 | 8/2009 | Bender et al. |
| 2009/0234903 A1 | 9/2009 | Lomelli et al. |
| 2010/0168874 A1 | 7/2010 | Lucas et al. |
| 2010/0232317 A1 | 9/2010 | Jing et al. |
| 2011/0216059 A1 | 9/2011 | Espiritu et al. |
| 2012/0011491 A1 | 1/2012 | Eldar |
| 2012/0101680 A1 | 4/2012 | Trepagnier et al. |
| 2012/0131279 A1 | 5/2012 | Ciraula et al. |
| 2012/0238361 A1 | 9/2012 | Janis et al. |
| 2012/0254874 A1* | 10/2012 | Siira ...................... G06Q 50/30 |
| | | 718/102 |
| 2012/0259909 A1 | 10/2012 | Bachelor et al. |
| 2013/0011076 A1 | 1/2013 | Obzhirov |
| 2013/0274986 A1 | 10/2013 | Trepagnier et al. |
| 2014/0033026 A1 | 1/2014 | Sheridan et al. |
| 2014/0201418 A1 | 7/2014 | Turner et al. |
| 2015/0026687 A1 | 1/2015 | Yim et al. |
| 2015/0074279 A1 | 3/2015 | Maes et al. |
| 2015/0205696 A1 | 7/2015 | Hanckel et al. |
| 2015/0227270 A1 | 8/2015 | Yun et al. |
| 2015/0264554 A1 | 9/2015 | Addepalli et al. |
| 2015/0347108 A1 | 12/2015 | Munshi et al. |
| 2016/0104204 A1 | 4/2016 | Greenberg et al. |
| 2016/0216072 A1* | 7/2016 | McNeil ................... F41G 3/165 |
| 2016/0253908 A1* | 9/2016 | Chambers .............. G08G 5/006 |
| | | 701/2 |
| 2016/0254957 A1 | 9/2016 | Maes |
| 2017/0059692 A1* | 3/2017 | Laufer .................. F41G 7/2253 |
| 2017/0195458 A1* | 7/2017 | Parekh ................... G06F 9/547 |
| 2017/0329730 A1 | 11/2017 | Sadhu |
| 2018/0105271 A1 | 4/2018 | Wypyszynski et al. |
| 2018/0188747 A1* | 7/2018 | Venturelli .............. G06Q 10/08 |
| 2018/0212863 A1 | 7/2018 | Akcan et al. |
| 2019/0246289 A1 | 8/2019 | Monga et al. |
| 2019/0333494 A1* | 10/2019 | Park ....................... H04R 3/005 |

OTHER PUBLICATIONS

Non Final Office Action for U.S. Appl. No. 15/901,486 dated Nov. 22, 2019.
Non Final Office Action for U.S. Appl. No. 16/250,927 dated Apr. 16, 2020.
Non Final Office Action for U.S. Appl. No. 16/178,345 dated Apr. 6, 2020.
Final Office Action for U.S. Appl. No. 15/901,486 dated Mar. 31, 2020.
Final Office Action for U.S. Appl. No. 16/178,345 dated Aug. 21, 2020.
European Office Action for Application No. 16 720 968.3-1224 dated Jan. 14, 2020.
Final Office Action for U.S. Appl. No. 15/901,486 dated Jan. 28, 2021.

* cited by examiner

SOFTWARE FRAMEWORK FOR AUTONOMOUS SYSTEM

TECHNICAL FIELD

This disclosure relates to a software framework for an autonomous system.

BACKGROUND

In computer science, a software framework is a generalization in which software providing common functionality can be selectively changed by additional user-written code, thus providing application-specific software. A software framework provides a standard way to build and deploy applications. A software framework is a universal, reusable software environment that provides particular functionality as part of a larger software platform to facilitate development of software applications, products and solutions. Software frameworks may include support programs, compilers, code libraries, tool sets, and application programming interfaces (APIs) that bring together all the different components to enable development of a project or system.

An API is a set of routines, protocols, and tools for building software applications. An API expresses a software component in terms of operations, inputs, outputs and underlying types. An API defines functionalities that are independent of their respective implementations, which allows definitions and implementations to vary without compromising the interface.

A sortie can refer to a deployment or dispatch of one military unit, be it an aircraft, ship, or troops, from a strongpoint. The sortie, whether by one or more aircraft or vessels, usually has a specific mission. A sortie rate is the number of sorties that a given unit can support in a given time.

SUMMARY

One example relates to a non-transitory machine readable medium having machine readable instructions. The machine readable instructions can include a software framework for an autonomous system. The software framework can include a sortie controller that receives a sortie spawn request from at least one of a station controller, a vehicle controller and a mission controller that are each in communication with at least one of a plurality of external systems. The sortie controller can instantiate a given sortie spawn with a reference to a given station model in a set of station models, a given vehicle model in a set of vehicle models and a given mission model in the set of mission models. Each of the given station model, the given vehicle model and the given mission model are each unassigned to a different sortie spawn. The software framework can also include a plurality of functions defined by the station controller, the vehicle controller and the mission controller, wherein each of the plurality of functions is configured to operate on the sortie spawn. The software framework can further include a plurality of capabilities that each provide a normalized interface for an application software. Each capability can include a plurality of properties that are populated by a set of the plurality of functions.

Another example relates to a system that includes a non-transitory memory to store machine readable instructions and a processing unit to access the memory and execute the machine readable instructions. The machine readable instructions include a station controller that communicates with a first external system via a network, the station controller instantiating a plurality of station models. The machine readable instructions can also include a vehicle controller that communicates with a second external system via the network, the vehicle controller instantiating a plurality of vehicle models and a mission controller that communicates with a third external system via the network, the mission controller instantiating a plurality of mission models. The machine readable instructions can further include a sortie controller that can receive a sortie spawn request from at least one of the station controller, the vehicle controller and the mission controller. The sortie controller can verify, in response to the sortie spawn request, a presence of a given station model in the plurality of station models, a given vehicle model in the plurality of vehicle models and a given mission model in the set of the mission models wherein each of the given station model, the given vehicle model and the given mission model are each unassigned to a sortie spawn. The sortie controller can instantiate a given sortie spawn with a reference to the given station model, the given vehicle model and the given mission model. The machine readable instructions still further include a plurality of functions defined by the station controller, the vehicle controller and the mission controller, wherein each of the plurality of functions is configured to operate on the sortie spawn. The machine readable instructions yet further include a plurality of capabilities that each provide a normalized interface for an application software. Each capability includes a plurality of properties that are populated by a set of the plurality of functions.

Yet another example relates to a non-transitory machine readable medium having machine readable instructions. The machine readable instructions can include a software framework for an autonomous system. The software framework can include a station controller that communicates with a first external system, the station controller instantiates a set of station models. The software framework can also include a vehicle controller that communicates with a second external system, the vehicle controller instantiating a set of vehicle models and a mission controller that communicates with a third external system, the mission controller instantiating a set of mission models. The software framework can further include a sortie controller that receives a sortie spawn request from at least one of the station controller, the vehicle controller and the mission controller. The software framework can verify, in response to the sortie spawn request, a presence of a given station model in the set of station models, a given vehicle model in the set of vehicle models and a given mission model in the set of the mission models, wherein each of the given station model, the given vehicle model and the given mission model are unassigned to a sortie spawn. The software framework can instantiate a given sortie spawn with a reference to the given station model, the given vehicle model and the given mission model. The software framework can still further include a plurality of functions defined by the station controller, the vehicle controller and the mission controller, wherein each of the plurality of functions is configured to operate on the sortie spawn. The software framework can yet further include a plurality of capabilities that each provide a normalized interface for an application software. Each capability includes a plurality of properties that are populated by a set of the plurality of functions.

DETAILED DESCRIPTION

This disclosure relates to a software framework employable for an autonomous system. The software framework includes a station controller that communicates with a first external system, and the station controller can be programmed to instantiate a set of station models (data models). The station controller can communicate with the first external system via a network. As one example, the station controller can communicate with the first external system via an application programming interface (API) of the first external system. The software framework can include a vehicle controller that communicates with a second external system, the vehicle model being programmed to instantiate a set of vehicle models. The vehicle controller can communicate with the second external system via the network, such as through an API of the second external system. The software framework can further include a mission controller that communicates with a third external system, the mission controller being programmed to instantiate a set of mission models. The mission controller can communicate with the third external system via the network, such as through an API of the third external system.

The software framework includes a sortie controller that receives a sortie spawn request from at least one of the station controller, the vehicle controller and the mission controller. In response to the sortie spawn request, the sortie controller can verify a presence of a given station model in the set of station models, a given vehicle model in the set of vehicle model and a given mission model in the set of the mission models that are each unassigned to a sortie spawn. In response to the verification, the sortie controller can instantiate a given sortie spawn with a reference to the given station model, the given vehicle model and the given mission model. That is, the sortie spawn include a reference to one of each type of model.

The software framework can also include a plurality of functions defined by the station controller, the vehicle controller and the mission controller. Each function is configured to operate on the sortie spawn. The software framework can further include a plurality of capabilities that each provide a normalized interface for an application software. Each capability includes a plurality of properties that are populated by a set of the plurality of functions. In some examples, the application software can execute on a pilot workstation that deploys the autonomous system (e.g., an unmanned aerial vehicle (UAV)) via the capabilities of the software framework. By employment of the software framework, the application software is unburdened with the details of communicating with the external systems. Accordingly, changes to the software framework and/or the external systems do not require changes to the application software since the capabilities provide a normalized interface for the application software.

Figure 1:
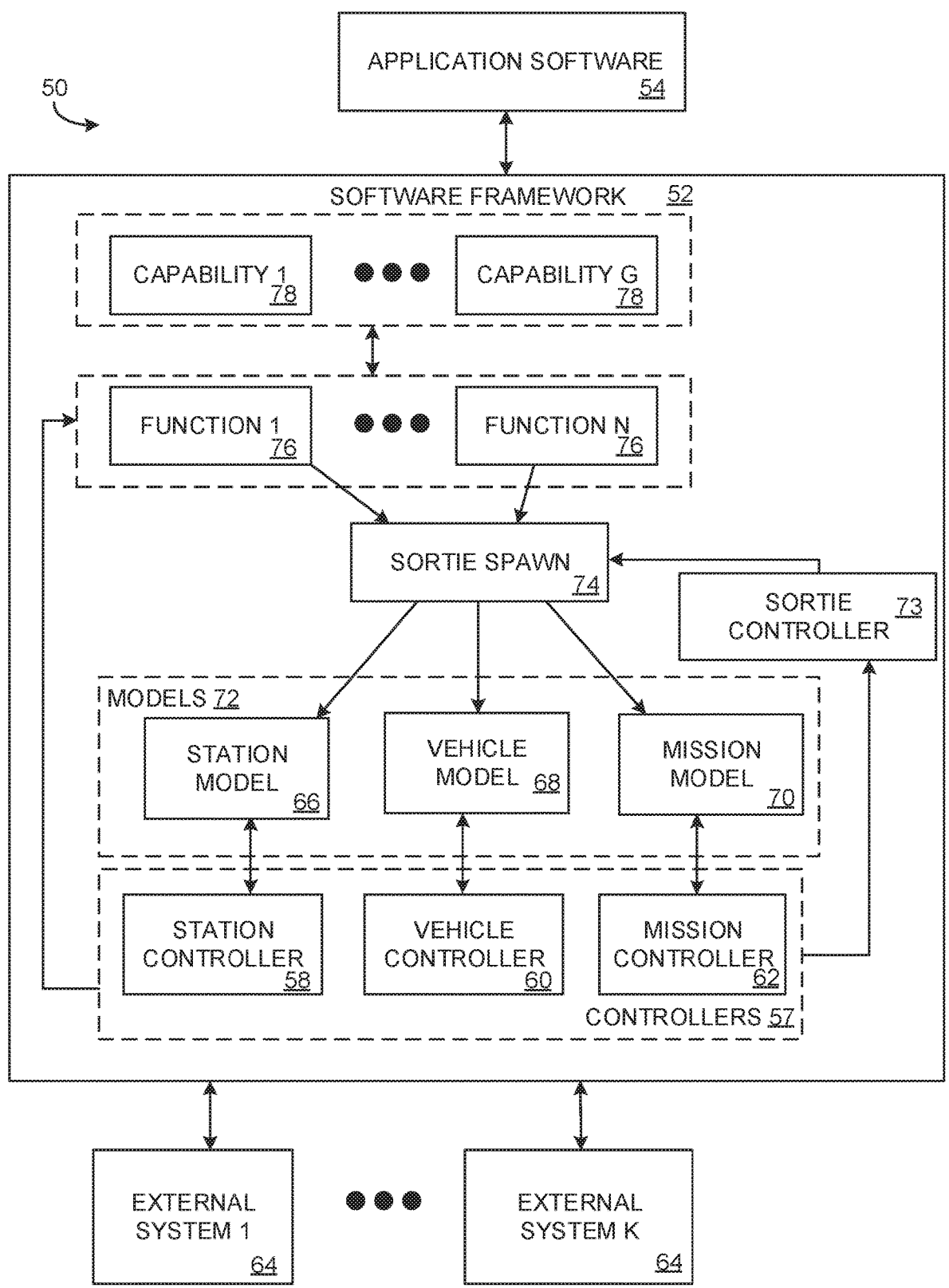
FIG. 1 illustrates an example of a system for implementing a software framework for autonomous systems.

FIG. 1 illustrates an example of a system 50 for implementing a software framework 52. The software framework 52 can be employed, for example, to develop application software 54 (e.g., one or more Apps) for deploying, monitoring and/or controlling autonomous systems, such as an autonomous vehicle or a fleet of autonomous vehicles. The software framework 52 can be implemented as machine executable instructions stored on a non-transitory machine readable medium (volatile and/or non-volatile memory). The software framework 52 can be executed by one or more computing devices (e.g., a server).

The application software 54 could be implemented, for example, as front-end software applications (e.g., end-user software applications) as well as server-client applications. Moreover, the application software 54 could be mission specific software or nearly any software application programed to facilitate completion of a task (e.g., a mission), such as a data or message delivery, strategic mission planning (e.g., which includes map data processing) and/or control of vehicles (or other equipment), including UAVs, self-driving terrestrial vehicles or other autonomous system.

The software framework 52 can include a set of controllers 57. The set of controllers 57 can include a station controller 58, a vehicle controller 60 and a mission controller 62. The station controller 58, the vehicle controller 60 and the mission controller 62 can be implemented as an instantiation of a software process (or multiple software processes) that communicates with an external system 64 of K number of external system 64. In some examples, the station controller 58, the vehicle controller 60 and the mission controller 62 can operate independently. As one example, the station controller 58 can communicate with an autonomous vehicle station (dispatch), which can be an instance of the K number of external systems 64. Additionally in one example, the vehicle controller 60 can communicate with an autonomous vehicle (e.g., an UAV or a self-driving terrestrial vehicle), which can be another instance of the K number of external systems 64. Furthermore, in one example, the mission controller 62 can communicate with a mission control system, which can be yet another instance of the K number of external systems 64.

In some examples, the controllers 57 and the external systems 64 can communicate over a network (e.g., a private network, a public network or a combination thereof). In some examples, the controllers 57 can communicate with the K number of external systems 64 via an application programming interfaces (APIs). For instance, in one example, the station controller 58 can communicate with a first external system 64 via an API of the first external system 64. Similarly, the vehicle controller 60 can communicate with a second external system 64 via an API of the second external system 64, and the mission controller 62 can communicate with a third external system 64 via an API of the third external system 64. Moreover, in some examples, each controller 57, or some subset thereof, can communicate with multiple external systems 64. For instance, the station controller 58 could be configured to communicate with the first external system 64 and the second external system 64. For example, the vehicle controller 60 may communicate with a UAV and a Digital Terrain Elevation Data (DTED) system.

The station controller 58 can instantiate (spawn) a set of station model 66. Additionally, the vehicle controller 60 can instantiate a vehicle model 68 and the mission controller 62 can instantiate a mission model 70. The station model 66, the vehicle model 68 and the mission model 70 can collectively be referred to as models 72. Each of the models 72 can be implemented as a data model (e.g., a class). Specifically, each of the station model 66, the vehicle model 68 and the mission model 70 can be implemented as instances of a data model. As discussed herein, in some examples each of the controllers 57 can instantiate multiple models 72 (e.g., a set of models 72). More particularly, in such examples, the station controller 58 can instantiate multiple station models 66 as a set of station models 66, the vehicle controller 60 can instantiate multiple vehicle models 68 as a set of vehicle models 66 and/or the mission controller 62 can instantiate multiple mission models 70 as a set of mission models 70. Each controller 57 can manage the instantiated model. In particular, the station controller 58 can manage the station model 66, the vehicle controller 60 can manage the vehicle model 68 and the mission controller can manage the mission model 70.

The software framework 52 can include a sortie controller 73. The sortie controller 73 can be implemented as a software process that can instantiate and manage a sortie spawn 74 or multiple sortie spawns, such as a set of sortie spawns.

The sortie controller 73 can receive a sortie spawn request (instantiation requests) from one or more of the controllers 57. That is, the sortie controller 73 can receive a sortie spawn request from at least one of the station controller 58, the vehicle controller 60 and/or the mission controller 62. Upon receiving a sortie spawn request from an instance of a given controller 57, the sortie controller 73 can verify that an available (unassigned to another sortie spawn) instance of the station model 66, the vehicle model 68 and the mission model 70 have been instantiated. That is, the sortie controller 73 delays instantiation of the sortie spawn 74 until at least one of each type of the models 72 has been instantiated and is available for the sortie spawn 74. As used herein, the term "sortie" refers to an active deployment of a single autonomous system, such as a UAV or a self-driving vehicle. In some examples, a sortie spawn 74 can be instantiated to facilitate execution of a task (e.g., a mission) and deleted upon termination of the task (e.g., completion, failure to complete, etc.).

As noted, upon receiving a sortie spawn request from at least one type of the models 72, the sortie controller 73 can instantiate the sortie spawn 74. Stated differently, the sortie controller 73 can instantiate the sortie spawn upon receiving a spawn request from the station controller 58, the vehicle controller 60 and/or the mission controller 62. The sortie spawn 74 can be representative of an instance of a class that includes a reference to each type of the models 72. That is, the sortie spawn 74 can include a reference to the station model 66, the vehicle model 68 and the mission model 70.

The controllers 57 can collectively define N number of functions 76 for the software framework 52. Each of the N number of functions 76 can be called (directly or indirectly, as described herein) by one or more of the K number of external systems and/or the application software 54. Each of the N number of functions 76 causes the sortie spawn 74 to operate on one or more of the referenced station model 66, the vehicle model 68 and the mission model 70.

Results of the operations executed by the N number of functions can be aggregated and provided to support (populate) one of G number of capabilities 78. Each of the G number of capabilities can represent a set of properties that are accessible by the application software 54. Such properties can include, for example, get and/or set operations (often referred to as "getters" and "setters"). Each get operation in a given capability 78 can retrieve a value (or a set of values) that are determined by one or more of the N number of functions function 76. Additionally, each set operation in a given capability 78 can cause execution of one or more of the N number of functions 76. In this manner, the application software 54 can trigger execution of some (or all) of the N number of functions 76.

As an example, the application software 54 can be executed on a pilot workstation. In such a situation, the application software 54 operates as a graphical user interface for a UAV (or multiple UAVs). In this situation, the pilot workstation can cause the application software 54 to leverage the G number of capabilities 78 to deploy, monitor and/or control the UAV.

In some examples, actuation of a user control (e.g., a button) on the pilot workstation can cause a function 76 to trigger the vehicle controller 60 to provide a sortie spawn request to the sortie controller 73. In response, the sortie controller 73 can verify that the station model 66, the vehicle model 68 and the mission model 70 have been instantiated. Upon such a verification, the sortie controller 73 can instantiate the sortie spawn 74 that includes a reference to the station model 66, the vehicle model 68 and the mission model 70.

Upon instantiation of the sortie spawn 74, actuation of another user control (e.g., a button) associated with the application software 54 can trigger a get operation on a first capability 78. In response, the get operation of the first capability 78 can cause a first function 76 to provide the sortie spawn 74 with a request for an operation on the station model 66, the vehicle model 68 and/or the mission model 70. In response, each of the station model 66, the vehicle model 68 and/or the mission model 70 can initiate execution of an operation on the station controller 58, the vehicle controller 60 and/or the mission controller 62. In turn, the station controller 58, the vehicle controller 60 and/or the mission controller 62 executes functions on the K number of external systems 64, or some subset thereof.

Through operation of the software framework 52, operations that are not possible with a single controller 57 and/or single external system 64 can be executed. For instance, in a first example (hereinafter, "the first example"), it is presumed that a given capability 78 is a terrain avoidance capability for a UAV, wherein the sortie spawn 74 is instantiated, and the vehicle controller 60 is in communication with the UAV, which is implemented as a given external system 64. In such a situation, the application software 54 can execute a set operation on the given capability 78 that causes the UAV to avoid a collision with terrain.

Continuing with the first example, the external system 64 corresponding to the UAV provides the vehicle controller 60 with periodic (and/or asynchronous) messages that updates a current location of the UAV. In response to such updates, the vehicle controller 60 can push the current location to the vehicle model 68. In the first example, it is presumed that that the current location includes geographic coordinates (e.g., latitude and longitudinal coordinates), a current heading and an altitude for the UAV. Additionally, the set operation the of given capability 78 causes a first function 76 to retrieve the current location for the UAV. More particularly, in the first example, the first function 76 can cause the sortie spawn 74 to retrieve geographic coordinates, an altitude and a heading from the vehicle model 68. Thus, the sortie spawn 74 can provide the first function 76 with the geographic coordinates, the current heading and the current altitude of the UAV. Additionally, the first function 76 can return values to update (populate) a property of the given capability 78 with the current location (the geographic coordinates, the current heading and the altitude) of the UAV.

Continuing with the first example, the first function 76 can cause also the sortie spawn 74 to request a terrain for the UAV. In particular, the sortie spawn 74 can cause the vehicle model 68 to have the vehicle controller 60 request data characterizing the terrain of the current location from an external system 64 that implements a Digital Terrain Elevation Data (DTED) System. In response, the vehicle controller 60 can update a terrain property of the vehicle model 68 with the data characterizing the terrain of the current location of the UAV. The first function 76 can return value to update (populate) data representing the terrain of the UAV in the given capability 78, thereby normalizing the interface for the application software 54.

In a situation where the terrain of the current location and the altitude of the UAV indicates that the UAV is flying too low, the given capability 78 can trigger execution of a second function 76 that can execute commands to determine potential terrain collisions. In particular, the second function 76 can employ the current heading, the geographic coordinates and terrain of the current location of the UAV to calculate vector projections (e.g., a trajectory) to identify potential collisions of the UAV. The second function 76 can provide a list of potential collisions as a property of the given capability 78 that are accessible by the application software 54. Accordingly, the application software 54 can employ the list of potential collisions and provide the list in output (e.g., a warning) and/or trigger the execution of evasive maneuvers for the UAV.

Thus, in the first example, the given capability 78 (terrain avoidance capability) can leverage data from two (2) disparate external systems 64, namely, the UAV itself and the DTED system. However, from the point of view of the application software 54, the given capability 78 appears as a single set of properties. Accordingly, the application software 54 is unburdened with the details for operations related to the terrain avoidance capability. Consequently, changes to features of the software framework 52, including changes to the models 72 and/or the controller 57 as well as changes to the external system 64 can be hidden from the application software 54. Thus, such changes to the software framework 52 and/or the K number of external systems 64 do not necessitate changes to the application software 54. The converse is also true. That is, changes to the application software 54 do not require changes to the software framework 52 and/or the K number of external systems 64. In this manner, the software framework 52, the K number of external systems 64 and the application software 54 can be developed independently.

In a second example (hereinafter, "the second example"), it is presumed that a given capability 78 is an auto-navigation capability for a UAV, wherein the sortie spawn 74 is instantiated, and the vehicle controller 60 is in communication with the UAV, which is implemented as a given external system 64. In such a situation, the application software 54 can execute a set operation on the given capability 78 that causes the UAV to operate autonomously. In the second example, a first function 76 triggered by the get operation operates in a manner similar to the first function 76 in the first example. Specifically, in the second example, the external system 64 corresponding to the UAV provides the vehicle controller 60 with periodic (and/or asynchronous) messages that identify a current location (including the geographic coordinates, the current heading and the current altitude) of the UAV. In response to such updates, the vehicle controller 60 can push the location and the heading to the vehicle model 68.

Additionally, the set operation of the given capability 78 causes a first function 76 to retrieve the current location of the UAV. More particularly, in the first example, the first function 76 can cause the sortie spawn 74 to retrieve the current location for the UAV from the vehicle model 68. Thus, the sortie spawn 74 can provide the first function 76 with the current location (the geographic coordinates, the current heading and the altitude) of the UAV. Additionally, the first function 76 can update a property of the given capability 78 with the current location of the UAV.

Continuing with the second example, the first function 76 can also cause the sortie spawn 74 to request a magnetic variation for the UAV. In particular, the sortie spawn 74 can cause the vehicle model 68 to have the vehicle controller 60 request data characterizing the magnetic variation of the current location from an external system 64 that implements a world magnetic model system. In response, the vehicle controller 60 can update a terrain property of the vehicle model 68 with the data characterizing the magnetic variation of the current location of the UAV. The first function 76 can update data representing magnetic variation for the UAV in the given capability 78, thereby normalizing the interface for the application software 54.

In the second example, a second function 76 that can execute commands to determine how to employ the magnetic variation of the current location to control the UAV. In particular, the second function 76 can employ the current heading, the current location and magnetic variation of the current location of the UAV to calculate a proposed trajectory for the UAV. Accordingly, the application software 54 is can employ the proposed trajectory and provide the list in output and/or trigger the execution of maneuvers for the UAV. Thus, in the second example, similar to the first example, the given capability 78 (auto-navigation) can leverage data from two (2) disparate external systems 64, namely, the UAV itself and the world magnetic model system.

In a third example (hereinafter, "the third example"), it is presumed that a given capability 78 is a next waypoint capability for a UAV, wherein the sortie spawn 74 is instantiated, and the vehicle controller 60 is in communication with the UAV, which is implemented as a given external system 64. In such a situation, the application software 54 can execute a get operation on the given capability 78 that causes the UAV to provide information identifying a next waypoint identifier (ID) and associated type for the UAV in a standardized format. The get operation of the given capability 78 causes a first function 76 to execute. The first function 76 can be referred to as a next waypoint definition function. Specifically, in the third example, the external system 64 corresponding to the UAV provides the vehicle controller 60 with periodic (and/or asynchronous) messages that identify a next waypoint identifier ID. In response to such updates, the vehicle controller 60 can push the next waypoint ID to the vehicle model 68. Additionally, in the third example, it is presumed that the mission controller 62 pushes a list of each waypoint ID and associated types for a mission of the UAV into the mission model 70.

Continuing with the third example, the first function 76 monitors the updates to the next waypoint ID in the vehicle model 68 through the reference in the sortie spawn 74. In response to such an update, the first function 76 can provide a request through the mission model 70 referenced in the sortie spawn 74 for a waypoint type based on the next waypoint ID updated in the vehicle model 68. In response, the sortie spawn 74 can access the list of waypoints for the mission of the UAV and associated types to return the type that is associated with the next waypoint ID provided from the vehicle controller to the first function. The first function can update the property in the given capability 78 with the next waypoint ID and the associated type. The application software 54 can employ the properties of the given capability 78 to output information identifying the next waypoint ID and/or the type of the next waypoint ID. In this manner, the properties of the given capability 78 are normalized from the perspective of the application software 54.

In a fourth example (hereinafter, "the fourth example"), it is presumed that a given capability 78 is a commanded heading capability that provides a commanded heading for a UAV, wherein the sortie spawn 74 is instantiated, and the vehicle controller 60 is in communication with the UAV, which is implemented as a given external system 64. In such a situation, the application software 54 can execute a get operation on the given capability 78 that causes the UAV to provide information identifying the commanded heading for the UAV in a standardized format. The get operation causes a first function 76 to execute. The first function 76 can be referred to as a commanded value function. Specifically, in the fourth example, the external system 64 corresponding to the UAV provides the vehicle controller 60 with aperiodic command reply messages that include the UAV's commanded heading value. In the fourth example, the first function 76 detects/intercepts these messages and extracts the commanded heading value.

Moreover, the first function 76 pushes the extracted commanded heading value to a field in the vehicle model 68 via the reference in the sortie spawn 74. The update/population of the extracted commanded heading value is reflected in a property the given capability that references (indirectly) the field in the vehicle model 68 with the extracted heading value. In this manner, the commanded heading value for the UAV is updated in response to the vehicle controller 60 receiving a command reply that includes the heading value.

As noted, in the first, second, third and fourth examples, each capability 78 provides a "normalized" interface. That is, in spite of some capabilities 78 requiring interaction with multiple disparate external systems 64 and/or disparate controllers 57, the properties of the capabilities 78 are well-defined and uniform. Thus, from the point of view of the application software 54, each of the G number of capabilities 78 appears as a single set of properties. Accordingly, the application software 54 is unburdened with the details for operations related to each of the capability 78. Consequently, changes to features of the software framework 52, including changes to the models 72 and/or the controller 57 as well as changes to the external system 64 can be hidden from the application software 54. Thus, such changes to the software framework 52 and/or the K number of external systems 64 do not necessitate changes to the application software 54. Similarly, changes to the application software 54 do not necessitate changes to the software framework 52 and/or the K number of external systems 64. Therefore, the application software 54, the software framework 52 and the K number of external systems 64 can be developed independently.

Figure 2:
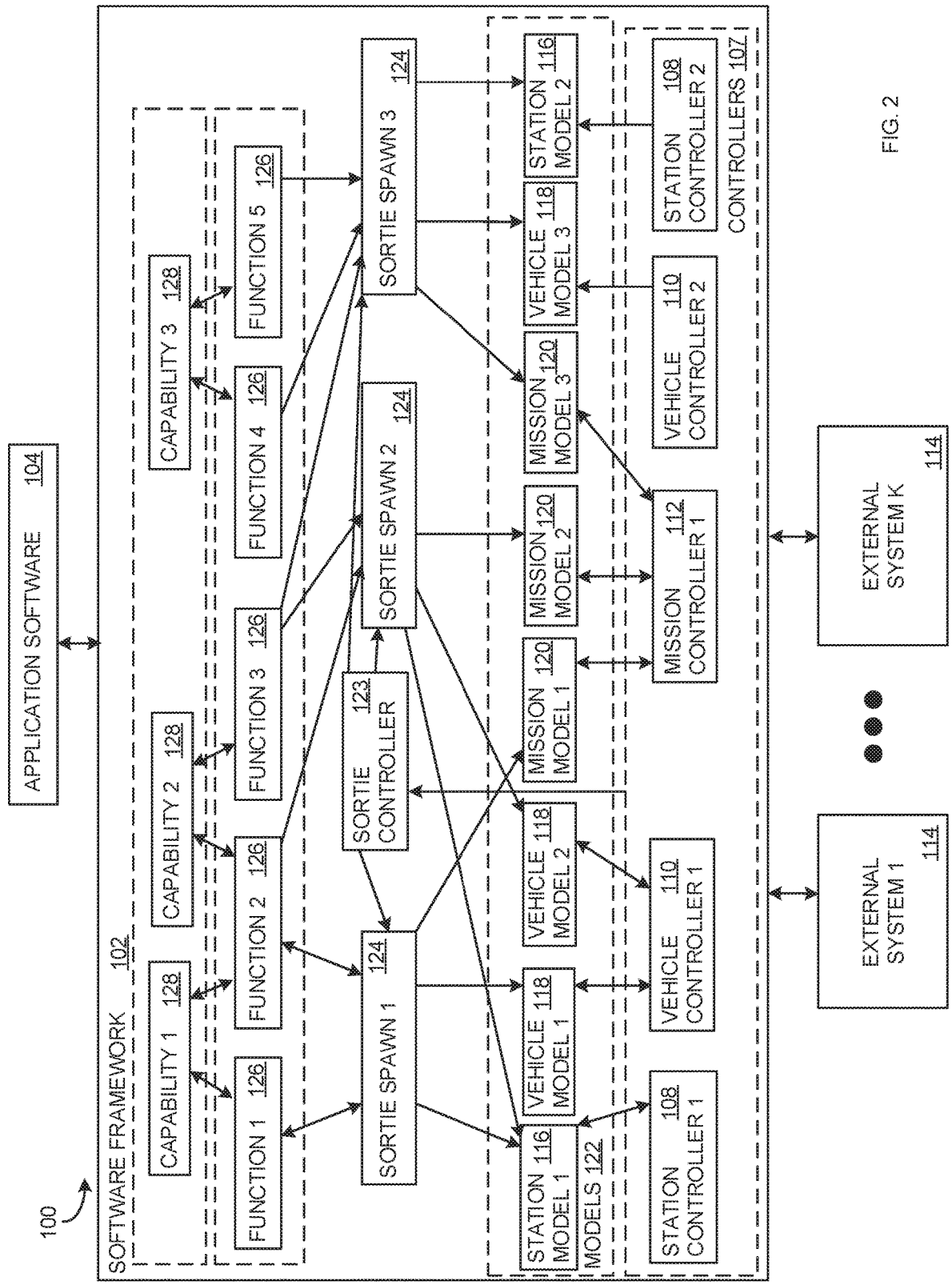
FIG. 2 illustrates another example of a system for implementing a software framework for autonomous systems.

FIG. 2 illustrates an example of a system 100 that provides an example implementation of the software framework 52 of FIG. 1. The software framework 102 illustrated in FIG. 2 can be employed, for example, to develop application software 104 (e.g., one or more Apps) for deploying, monitoring and/or controlling autonomous systems, such as an autonomous vehicle or a fleet of autonomous vehicles. The software framework 102 can be implemented as machine executable instructions stored on a non-transitory machine readable medium (volatile or non-volatile memory). The software framework 102 can be executed by one or more computing devices (e.g., a server).

In the example illustrated in FIG. 2, a set of controllers 107 are included in the software framework 102. In the illustrated example, the set of controllers 107 includes a first station controller 108 ("station controller 1") and a second station controller 108 ("station controller 2"). Additionally, the set of controller 107 includes a first vehicle controller 110 ("vehicle controller 1") and a second vehicle controller ("vehicle controller 2"). The set of controllers 107 further includes a (single) mission controller 112 ("mission controller 1"). Each of the first and second station controllers 108, the first and second vehicle controllers 110 and the mission controller 112 can be implemented as an instantiation of a software process (or multiple software processes) that communicates with an external system 114 of K number of external system 114.

In some examples, each of the set of controllers 107 can operate independently. That is, the first and second station controllers 108, the first and second vehicle controllers 110 and the mission controller 112 can operate independently. As one example, the station controller 108 can communicate with an autonomous vehicle station (dispatch), which can be an instance of the K number of external systems 114. Additionally, the vehicle controller 110 can communicate with an autonomous vehicle (e.g., an UAV or a self-driving terrestrial vehicle), which can be another instance of the K number of external systems 114. Furthermore, the mission controller 112 can communicate with a mission control system, which can be yet another instance of the K number of external systems 114.

In the example system 100, the first station controller 108 instantiates (spawns) a first station model 116 ("station model 1"). Additionally, the first vehicle controller 110 instantiates a first vehicle model 118 ("vehicle model 1") and a second vehicle model 118 ("vehicle model 2"). The mission controller 112 instantiates a first mission model 120 ("mission model 1"), a second mission model 120 ("mission model 2") and a third mission model 120 ("mission model 3"). The second vehicle controller 110 instantiates a third vehicle model 118 ("vehicle model" 3) and the second station controller 110 instantiates a second station model 116 ("station model 2"). The first, second and third station models 116, the first, second and third mission models 120 and the first, second and third vehicle models 118 can collectively be referred to as models 122. Each of the models 122 can be implemented as a data model (e.g., a class). As illustrated, each controller 107 can manage the instantiated models 122.

The software framework 102 can include a sortie controller 123. The sortie controller 123 can be implemented as a software process that can instantiate and manage sortie spawns 124. In the example illustrated, the sortie controller 123 instantiates a first sortie spawn 124 ("sortie spawn 1"), a second sortie spawn 124 ("sortie spawn 2") and a third sortie spawn 124 ("sortie spawn 3").

The sortie controller 123 can a receive sortie spawn request (instantiation requests) from any the controllers 107. Upon receiving a sortie spawn request from an instance of a given type of the models 122, the sortie controller 123 can verify that an available (unassigned to another sortie spawn) model of each type is instantiated and then instantiate a sortie spawn 124. For example, in response to the example system 100, if the first station controller 108 requests a sortie spawn 124, the sortie controller 122 identifies the first station model 116, the first vehicle model 118 and the first mission model 120 as being available (unreferenced by another sortie spawn 124).

As noted, upon receiving a sortie spawn request and verifying that an instance of each type of model 122 is available, the sortie controller 123 can instantiate the sortie spawn 124. Each sortie spawn 124 can be representative of an instance of a class that includes a reference to each type of the models 122. That is, the first sortie spawn 124 can include a reference to the first station model 116, the first vehicle model 118 and the first mission model 120. Similarly, the second and third sortie spawns 124 can be instantiated in a similar manner.

The controllers 107 can collectively define N number of functions 126 for the software framework 102. Each of the N number of functions 126 can be called (directly or indirectly, as described herein) by one or more of the K number of external systems and/or the application software 104. Each of the N number of functions 126 causes the sortie spawn 124 to operate on one or more of the referenced station model 116, the vehicle model 118 and the mission model 120. Additionally, in some examples, each function 126, or some subset thereof, can call operations on one or more of the controllers 107.

In the example illustrated, a first function 126 ("function 1") and a second function 126 ("function 2") operate on the first sortie spawn 124. Additionally, the second function 126 and a third function 126 ("function 3") operate on the second sortie spawn 124. Similarly, the third function 126, a fourth function 126 ("function 4") and a fifth function 126 ("function 5") operate on the third sortie spawn 124. Further, a fourth function 126 ("function 4") and a fifth function 126 ("function 5") operate on the third sortie spawn 124.

As explained with respect to FIG. 1, results of the operations executed by the N number of functions 126 can be aggregated and provided as one of G number of capabilities 128 in a normalized fashion. Each of the G number of capabilities 128 can represent a set of properties that are accessible by the application software 104. Such properties can include, for example, get and/or set operations (often referred to as "getters" and "setters"). Each get operation in a given capability 128 can retrieve a value (or a set of values) that are determined by one or more of the N number of functions function 126. Additionally, each set operation in a given capability 128 can cause execution of one or more of the N number of functions 126. In this manner, the application software 104 can trigger execution of some (or all) of the N number of functions 126.

In the example system 100, the first function 126 and the second function 126 provide properties for a first capability 128. The second function 126 and the third function 126 provide properties for the second capability 128, and the fourth function 126 and the fifth function 126 provide properties for the third capability 128. The software framework 102 could be employed, for example, to implement the first example, the second example, the third example and/or the fourth example explained with respect to FIG. 1.

As demonstrated by the system 100, there is substantial variance in how properties of the capabilities are populated and/or updated. However, from the perspective of the application software 104, the variance is transparent. That is, the application software 104 receives a normalized interface at each of the capabilities 128 that does not vary based on the underlying structure of the software framework 102. In this manner, changes to the software framework 102 and/or the K number of external system 114 do not necessitate changes at the application software 104 (and vice-versa), thereby elevating possible code-reuse of features in the system 100. Accordingly, the application software 104 can benefit from the capabilities 128 provided by the software framework 102 without the burden of maintaining connections with individual components of needed to support the capabilities 128.

Figure 3:
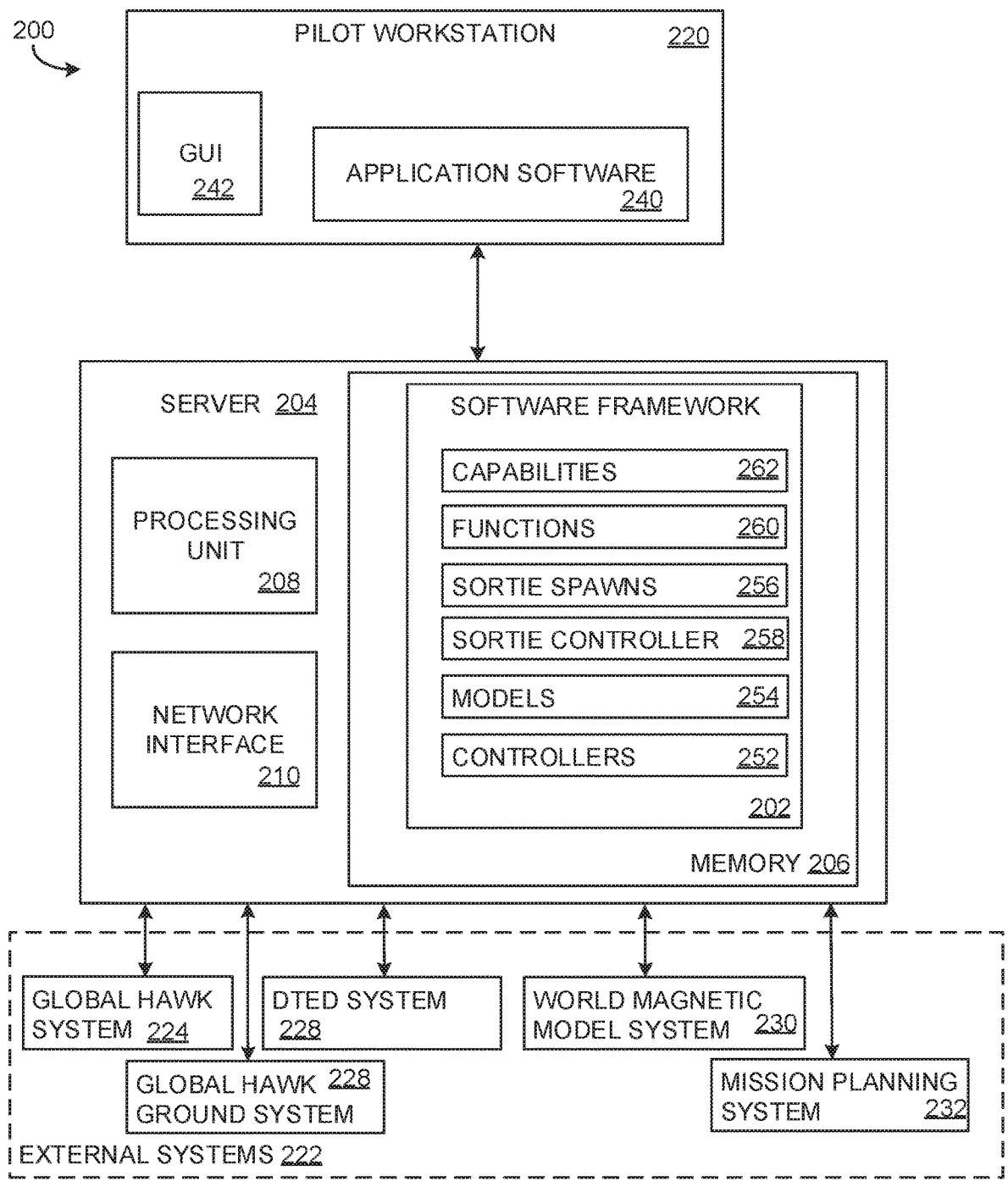
FIG. 3 illustrates an example of a system for implementing a software framework to deploy unmanned aerial vehicles (UAVs).

FIG. 3 illustrates an example of a system 200 for implementing a software framework 202. The software framework 202 could be employed to implement the software framework 52 of FIG. 1 and/or the software framework 102 of FIG. 2. A server 204 (or other computing device) can include a memory 206 that stores machine readable instructions, including the software framework 202.

The memory 206 can be implemented as a non-transitory machine readable medium, such as random access memory (RAM), a solid state drive, a hard disk drive, flash memory or a combination thereof. The server 204 can also include a processing unit 208 that accesses the memory 206 and executes the machine readable instructions stored in the memory 206. The server 204 can also include a network interface 210 that allows the server 204 to communicate on a network, such as a private network, a public network or a combination thereof.

The server 204 could be implemented in a computing cloud. In such a situation, features of the server 204 such as the processing unit 208, the network interface 210, and the memory 206 could be representative of a single instance of hardware or multiple instances of hardware with applications executing across the multiple of instances (i.e., distributed) of hardware (e.g., computers, routers, memory, processors, or a combination thereof). Alternatively, the server 204 could be implemented on a single dedicated server.

In at least one example, the software framework 202 operates as middleware between a plurality of external systems 222 and a pilot workstation 220. In this manner, the system 200 can be employed to manage and/or control autonomous systems, such as a UAV. The external systems 222 and the pilot workstation 220 can each communicate with the software framework 202 via a network (or multiple networks) through the network interface 210. It is understood that although the example illustrated in FIG. 3 depicts the software framework 202 and the pilot workstation 220 as executing on separate computing systems, in some examples, the software framework 202 and the pilot workstation 220 can be integrated and/or operate in parallel on a single computing system. In fact, in still other examples, the pilot workstation 220 and/or the software framework 202 can be integrated and/or operate in parallel with an instance of one or more of the external systems 222.

In the illustrated example, the external systems 222 include a global hawk system 224 that represents an instance of a UAV. The external systems 222 can also include a DTED system 228 for providing terrain information. The external systems 222 can still further include a world magnetic model system 230 that can provide information related to magnetism of specific areas of the earth. Further, the external systems 222 can include a mission planning system 232 that can generate and revise mission plans for UAVs.

The pilot workstation 220 can be implemented as a computing device. The pilot workstation 220 can include application software 240 that can be employed to implement the application software 54 of FIG. 1. The pilot workstation 220 can also include a graphical user interface (GUI) 242 that provides input and output for the application software 220. In some examples, the GUI 242 can include features that allow user input and/or output, such as virtual buttons, radio dials and/or other user controls.

The software framework 202 includes controllers 252 (e.g., the controllers 57 of FIG. 1) that communicate with the external systems 222 via the network interface 210. In particular, as discussed herein, the controllers 252 can communicate with the external systems 222 via APIs for each of the external systems 222. As discussed herein, the controllers 252 can instantiate models 254 (e.g., the models 72 of FIG. 1). Moreover, each of the controllers 252 can provide a request for instantiation of a sortie spawn 256 to a sortie controller 258. In response, the sortie controller 258 can verify that a model of each type of model (e.g., a station model, a vehicle model and a mission model) are available (unassigned to another sortie spawn) for a sortie spawn 256. Upon such verification, the sortie controller 258 can instantiate the sortie spawn 256.

The controllers 252 support functions 260 that could be employed to implement the N number of functions 76 of FIG. 1. Additionally, the functions 260 provide data for capabilities 262 that include properties accessible by the application software 220. Moreover, as discussed herein, the software framework 202 is designed to sure that the capabilities 262 provide a normalized view of data, in spite of the disparate systems and processes executing on the software framework 202 and/or the external systems 222.

The application software 220 can be employed to manage and/or control the UAV represented by the global hawk system 224 via the software framework 202. More particularly, the software framework 202 can be configured/programmed to ensure that capabilities 262 provide a normalized interface for the application software 220. That is, the capabilities 262 provide an interface that remains constant in spite of changes to the software framework 202 and/or the external systems 222.

More particularly, the software framework 202 and the external systems 222 can operate in concert to support the capabilities 262 that operate in the manner described in the first, second, third and fourth examples described with respect to FIG. 1. For instance, the functions 260 can request data from the global hawk system 224 (a UAV) and the DTED system 228 through a sortie spawn 256 to support a terrain avoidance capability 262 described in the first example. Additionally, the functions 260 can request data from the global hawk system 224 and the world magnetic model system 230 to support the auto navigation capability 262 described in the second example. Further, the functions 260, the global hawk system 224 and a mission model of the models 254 can support the next waypoint capability 262 as described in the third example. Further still, the functions 260, the global hawk system 224 and a vehicle model of the models 254 can support the commanded heading capability 262 described in the fourth example.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine readable instructions, the machine readable instructions comprising a software framework for an autonomous system comprising:
 a sortie controller that:
  receives a sortie spawn request from at least one of a station controller, a vehicle controller and a mission controller that are each in communication with at least one of a plurality of external systems;

verifies, in response to receiving the sortie spawn request, a presence of an available instance of a station model, an available instance of a vehicle model, and an available instance of a mission model, wherein each of the station model, the vehicle model and the mission model are software classes; and instantiates, in response to the verification, a given sortie spawn with a reference to the available instance of the station model in a set of station model instances, the available instance of the vehicle model in a set of vehicle model instances and the available instance of the mission model in a set of mission model instances, wherein each of the available instance of the station model, the available instance of the vehicle model and the available instance of the mission model are each unassigned to another sortie spawn;

a plurality of functions defined by the station controller, the vehicle controller and the mission controller, wherein each of the plurality of functions is configured to operate on the given sortie spawn; and a plurality of capabilities that each provide a normalized interface for an application software, wherein each capability includes a plurality of properties that are populated by a set of the plurality of functions.

2. The medium of claim 1, wherein a given capability of the plurality of capabilities includes a get operation that triggers execution of a given function and another function of the plurality of functions.

3. The medium of claim 2, wherein the given capability is a terrain avoidance capability, and the given function causes the given sortie spawn to:

retrieve a current location from the available instance of the vehicle model, wherein the current location comprises:
  a current heading of an unmanned aerial vehicle (UAV);
  current geographic coordinates of the UAV; and
  a current altitude of the UAV; and retrieve terrain data that characterizes a terrain of the current location of the UAV from a Digital Terrain Elevation Data (DTED) system of the plurality of external systems.

4. The medium of claim 3, wherein the other function:
calculates a trajectory for the UAV based on the current location of the UAV;
determines a list of potential collisions for the UAV based on the calculated trajectory and on the terrain data for the current location of the UAV; and
returns the list of potential collisions for the UAV to the given capability for access by the application software.

5. The medium of claim 1, wherein a given capability of the plurality of capabilities includes a set operation that triggers execution of a given function and another function of the plurality of functions.

6. The medium of claim 5, wherein the given capability is an auto navigation capability, and the given function causes the given sortie spawn to:

retrieve a current location from the available instance of the vehicle model, wherein the current location comprises:
  a current heading of an unmanned aerial vehicle (UAV);
  current geographic coordinates of the UAV;
  a current altitude of the UAV; and retrieve magnetic variation data that characterizes a magnetic variation of the current location of the UAV from a world magnetic model system of the plurality of external systems.

7. The medium of claim 6, wherein the other function:
calculates a proposed trajectory for the UAV based on the current heading of the UAV and the magnetic variation data for the current location of the UAV; and
returns the proposed trajectory to the given capability for access by the application software.

8. The medium of claim 1, wherein a given capability of the plurality of capabilities includes a get operation that triggers execution of a given function.

9. The medium of claim 8, wherein the given capability is an auto navigation capability, and the given function causes the given sortie spawn to:

detect an update to a next waypoint identifier (ID) from the available instance of the vehicle model corresponding to an unmanned aerial vehicle (UAV); and retrieve an associated type for the next waypoint ID from the available instance of the mission model in response to detecting the update to the next waypoint ID; and return the next waypoint ID and the associated type to the given capability for access by the application software.

10. The medium of claim 8, wherein the given capability is a command heading capability, and the given function:
extracts a commanded heading from a message transmitted from an unmanned aerial (UAV);
causes the given sortie controller to push the extracted commanded to the available instance of the vehicle model; and
return the extracted commanded heading to the given capability.

11. The medium of claim 1, wherein the set of vehicle model instances comprises a plurality of vehicle models, the set of station model instances comprises a plurality of station models and the set of mission model instances comprises a plurality of mission models.

12. The medium of claim 1, wherein the sortie controller manages a plurality of sortie spawns comprising the given sortie spawn and the other sortie spawn.

13. The medium of claim 1, wherein the sortie controller delays instantiation of the given sortie spawn until the sortie controller verifies the presence of the available instance of the station model, the available instance of the vehicle model, and the available instance of the mission model.

14. A system comprising:
a non-transitory memory to store machine readable instructions; and
a processing unit to access the memory and execute the machine readable instructions, the machine readable instructions comprising:
  a station controller that communicates with a first external system via a network, the station controller instantiating a plurality of station models;
  a vehicle controller that communicates with a second external system via the network, the vehicle controller instantiating a plurality of vehicle models;
  a mission controller that communicates with a third external system via the network, the mission controller instantiating a plurality of mission models;
  a sortie controller that:
    receives a sortie spawn request from at least one of the station controller, the vehicle controller and the mission controller;
    verifies, in response to the sortie spawn request, a presence of an available instance of a station model in the plurality of station models, an available instance of a vehicle model in the plurality of vehicle models and an available instance of a mission model in the plurality of the mission models, wherein each of the available instance of the station model, the available instance of the vehicle model and the available instance of the mission model are each unassigned to a sortie spawn; and instantiates, in response to the verification, a given sortie spawn with a reference to the available instance of the station model, the available instance of the vehicle model and the available instance of the mission model;

a plurality of functions defined by the station controller, the vehicle controller and the mission controller, wherein each of the plurality of functions is configured to operate on the given sortie spawn; and a plurality of capabilities that each provide a normalized interface for an application software, wherein each capability includes a plurality of properties that are populated by a set of the plurality of functions.

15. The system of claim 14, wherein the application software executes on a pilot workstation to control each of a plurality of an unmanned aerial vehicles (UAVs).

16. The system of claim 14, wherein the first external system is an unmanned aerial vehicle (UAV) and the vehicle controller communicates with the UAV through an application programming interface (API).

17. The system of claim 14, wherein the capabilities operate independently from the vehicle controller, the mission controller and the station controller.

18. A non-transitory machine readable medium having machine readable instructions, the machine readable instructions comprising a software framework for an autonomous system comprising:

a station controller that communicates with a first external system, the station controller instantiating a set of station models;

a vehicle controller that communicates with a second external system, the vehicle controller instantiating a set of vehicle models;

a mission controller that communicates with a third external system, the mission controller instantiating a set of mission models;

a sortie controller that:

receives a sortie spawn request from at least one of the station controller, the vehicle controller and the mission controller;

verifies, in response to the sortie spawn request, a presence of an available instance of the station model in the set of station models, an available instance of the vehicle model in the set of vehicle models and an available instance of the mission model in the set of the mission models, wherein each of the station model, the vehicle model and the mission model are each unassigned to a sortie spawn; and instantiates, in response to the verification, a given sortie spawn with a reference to the available instance of the station model, the available instance of the vehicle model and the available instance of the mission model;

a plurality of functions defined by the station controller, the vehicle controller and the mission controller, wherein each of the plurality of functions is configured to operate on the given sortie spawn; and a plurality of capabilities that each provide a normalized interface for an application software, wherein each capability includes a plurality of properties that are populated by a set of the plurality of functions.

19. The medium of claim 18, wherein the first external system is an unmanned aerial vehicle (UAV) and the vehicle controller communicates with the UAV through an application programming interface (API).

20. The medium of claim 19, wherein the application software executes on a pilot workstation that commands and controls the UAV via the capabilities of the software framework.

21. The medium of claim 18, wherein each of the external systems operates independently.

* * * * *